US012754623B2

(12) United States Patent
Lai et al.

(10) Patent No.: US 12,754,623 B2
(45) Date of Patent: Oct. 6, 2026

(54) ACTIVE CAPACITIVE STYLUS AND WIRELESS CHARGING SYSTEM

(71) Applicant: EMRight Technology Co., Ltd., Hsinchu County (TW)

(72) Inventors: Ting-Cheng Lai, Hsinchu County (TW); Ming-Hui Chou, Hsinchu County (TW)

(73) Assignee: EMRight Technology Co., Ltd., Hsinchu County (TW)

( * ) Notice: Subject to any disclaimer, the term of this patent is extended or adjusted under 35 U.S.C. 154(b) by 0 days.

(21) Appl. No.: 19/080,920

(22) Filed: Mar. 16, 2025

(65) Prior Publication Data

US 2025/0306693 A1 Oct. 2, 2025

(30) Foreign Application Priority Data

Apr. 1, 2024 (TW) ................................ 113112413

(51) Int. Cl.
*G06F 3/0354* (2013.01)
*H02J 50/10* (2016.01)

(52) U.S. Cl.
CPC .......... *G06F 3/03545* (2013.01); *H02J 50/10* (2016.02)

(58) Field of Classification Search
CPC ............................ G06F 3/03545; H02J 50/10
See application file for complete search history.

(56) References Cited

U.S. PATENT DOCUMENTS

| | | | | |
|---|---|---|---|---|
| 9,626,011 | B2 * | 4/2017 | Chang | G06F 3/03545 |
| 10,627,923 | B2 * | 4/2020 | Ruscher | G06F 3/03545 |
| 10,725,515 | B2 * | 7/2020 | Marshall | G06F 1/1626 |
| 11,243,619 | B2 * | 2/2022 | Justin | G06F 3/03545 |
| 11,507,207 | B2 * | 11/2022 | Lan | H04R 1/1025 |
| 12,566,510 | B2 * | 3/2026 | Tanaka | G06F 1/26 |
| 2016/0126639 | A1 * | 5/2016 | Kim | H01Q 1/2208 307/104 |
| 2016/0320868 | A1 * | 11/2016 | Chang | G06F 3/03545 |
| 2019/0103764 | A1 * | 4/2019 | Marshall | G06F 1/1626 |
| 2020/0089340 | A1 * | 3/2020 | Ruscher | G06F 3/03545 |
| 2021/0255716 | A1 * | 8/2021 | Jin | G06F 1/26 |
| 2021/0286451 | A1 * | 9/2021 | Lan | G06F 3/03545 |
| 2021/0405776 | A1 * | 12/2021 | Justin | G06F 3/03545 |
| 2025/0036215 | A1 * | 1/2025 | Tanaka | G06F 3/0354 |

FOREIGN PATENT DOCUMENTS

| | | |
|---|---|---|
| CN | 107346906 | 11/2017 |
| CN | 207074891 | 3/2018 |
| CN | 107979185 | 5/2018 |

* cited by examiner

*Primary Examiner* — Michael J Jansen, II
(74) *Attorney, Agent, or Firm* — JCIPRNET

(57) ABSTRACT

An active capacitive stylus including a pen body, a receiver, an insulator, and a shell is provided. The pen body has an axial direction. The receiver surrounds the pen body to receive a radio frequency signal. The receiver includes an annular body with two opposite first sides and two opposite second sides. The length of each first side is greater than that of each second side. The two first sides are parallel to the axial direction. Each second side has a first radius of curvature and a second radius of curvature, and the first radius of curvature is different from the second radius of curvature. The insulator is located between the receiver and the pen body. The shell is sleeved on the pen body and wraps around the receiver. A wireless charging system is also provided.

7 Claims, 7 Drawing Sheets

ACTIVE CAPACITIVE STYLUS AND WIRELESS CHARGING SYSTEM

CROSS-REFERENCE TO RELATED APPLICATION

This application claims the priority benefit of Taiwan application serial no. 113112413, filed on Apr. 1, 2024. The entirety of the above-mentioned patent application is hereby incorporated by reference herein and made a part of this specification.

BACKGROUND

Technical Field

The disclosure relates to a stylus and a wireless charging system, and in particular to an active capacitive stylus and a wireless charging system including the active capacitive stylus.

Description of Related Art

Currently, various electronic devices on the market use a touch panel as a display interface and an operation interface. Although users may typically operate the touch panel with their fingers, for applications such as writing and drawing, fingers cannot completely replace the fine handwriting experience provided by a stylus. For professionals, electronic signatures, handwritten notes, and drawing are still better performed using a stylus in combination with a touch screen.

Generally, capacitive styluses are classified into active capacitive styluses and passive capacitive styluses. Take active capacitive stylus as an example, if the active capacitive stylus uses AAA, AA, or mercury button batteries for power supply, it will require periodic battery replacement. If the active capacitive stylus uses a lithium battery, once the battery runs out of power, the stylus must be charged for a period before it may be used again. Additionally, the lithium battery increases the cost of the active capacitive stylus.

Therefore, how to optimize the power supply method of an active capacitive stylus is one of the issues that a person having ordinary skill in the art aim to explore.

SUMMARY

An active capacitive stylus is provided, which may be wirelessly charged through a wireless charging transmitter.

A wireless charging system is provided, which includes the active capacitive stylus.

The active capacitive stylus includes a pen body, a receiver, an insulator, and a shell. The pen body has an axial direction. The receiver surrounds the pen body and is used to receive a radio frequency signal. The receiver includes an annular body with two opposite first sides and two opposite second sides. The length of each first side is greater than that of each second side. The two first sides are parallel to the axial direction. Each second side has a first radius of curvature and a second radius of curvature, where the first radius of curvature is different from the second radius of curvature. The insulator is located between the receiver and the pen body. The shell is sleeved on the pen body and wraps around the receiver.

The wireless charging system includes a wireless charging transmitter and the active capacitive stylus. The wireless charging transmitter includes a housing and a transmission coil. The housing has a charging surface. The transmission coil is disposed inside the housing. When the receiver is aligned with the transmission coil, the wireless charging transmitter is adapted to charge the active capacitive stylus. In a normal direction of the charging surface, there is a distance of 2 millimeters between the transmission coil and the receiver.

In an embodiment of the disclosure, the pen body includes a pen tip, an end portion, and a holding portion located between the pen tip and the end portion. The receiver is disposed at the holding portion.

In an embodiment of the disclosure, the annular body has two first end portions respectively corresponding to the two first sides. The two first end portions are bent toward each other.

In an embodiment of the disclosure, the insulator entirely surrounds the pen body.

In an embodiment of the disclosure, a length of the insulator in the axial direction is greater than or equal to that of each two first sides in the axial direction. The two first sides are attached to the insulator and spaced apart from each other to partially expose the insulator.

In an embodiment of the disclosure, the receiver has a hollow portion penetrating the annular body. In a cross-sectional view along a direction perpendicular to the axial direction, the annular body has a first maximum width, and the hollow portion has a second maximum width, where the first maximum width is greater than the second maximum width.

In an embodiment of the disclosure, the first radius of curvature is greater than or equal to 4.5 millimeters.

In an embodiment of the disclosure, the second radius of curvature is greater than 3 millimeters.

In an embodiment of the disclosure, the receiver is a coil wound into a thin sheet with the thickness of the sheet being less than 0.15 millimeters.

Based on the above, in the active capacitive stylus, the receiver is wrapped around the pen body to receive radio frequency signals. The first sides of the receiver are parallel to the axial direction of the pen body. The second sides of the receiver are bent to surround the pen body. Furthermore, the second sides of the receiver have different radii of curvature. Accordingly, when the active capacitive stylus is used with the wireless charging transmitter, an improved charging efficiency may be maintained.

To make the features and advantages of the disclosure more comprehensible, several embodiments accompanied with drawings are described in detail as follows.

DESCRIPTION OF THE EMBODIMENTS

Figure 1:
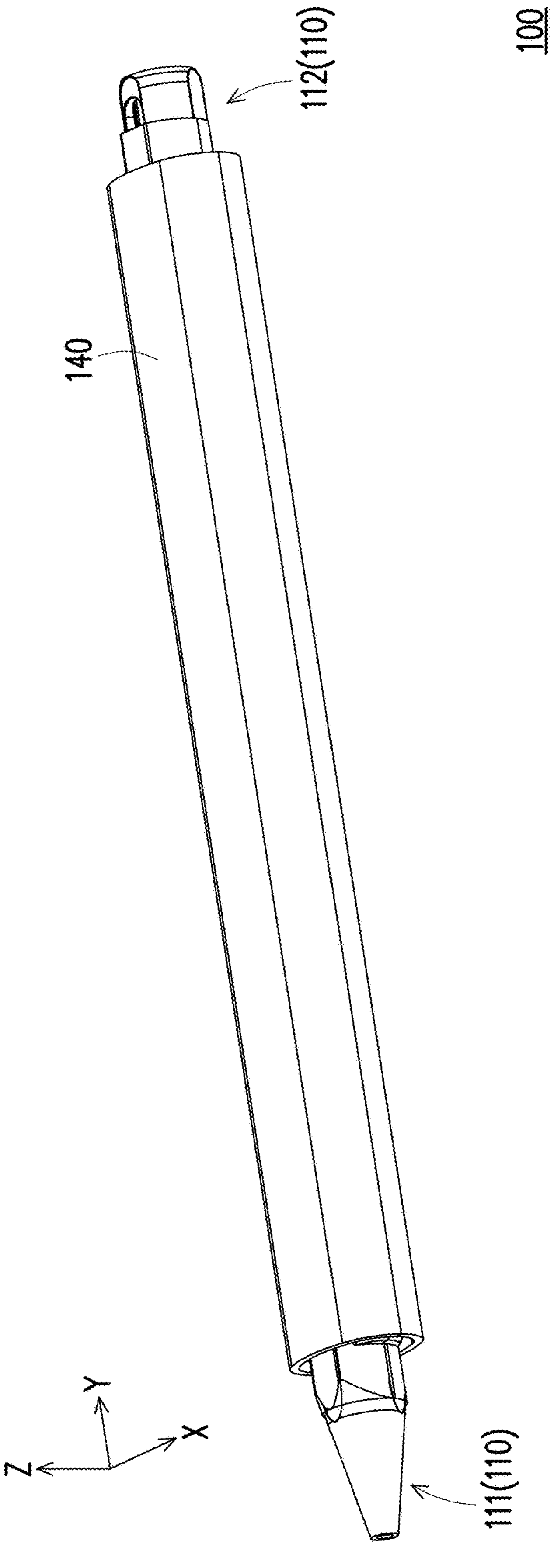
FIG. 1 is a perspective view of an active capacitive stylus according to an embodiment of the disclosure.
Figure 2:
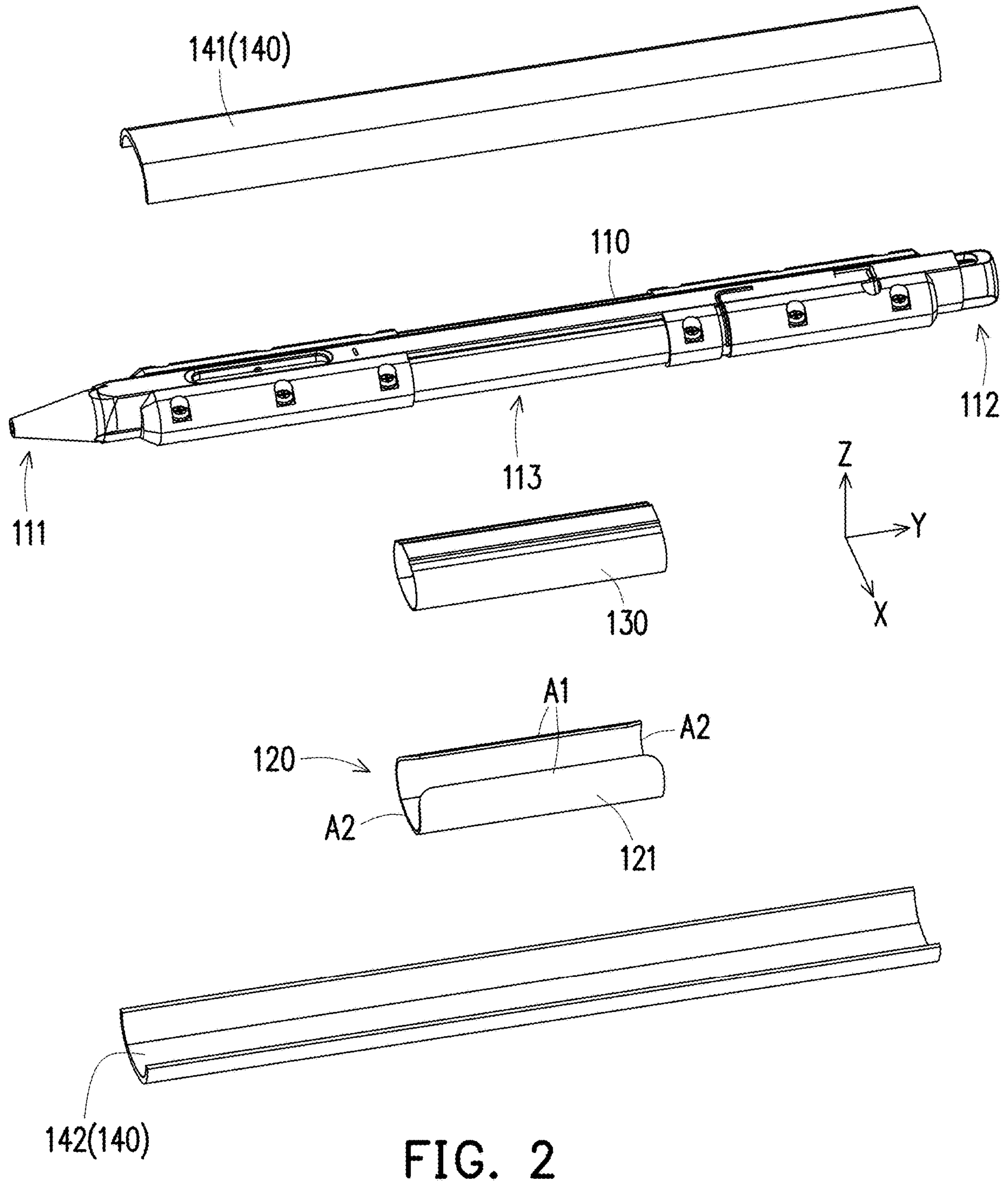
FIG. 2 is an exploded view of the active capacitive stylus in FIG. 1.

FIG. 1 is a perspective view of an active capacitive stylus according to an embodiment of the disclosure. FIG. 2 is an exploded view of the active capacitive stylus in FIG. 1. It should be noted that in FIGS. 1 and 2, the X direction, Y direction, and Z direction are labeled to present the configuration relationships among the components in the figures. The X, Y, and Z directions intersect with each other, but are not limited thereto.

Referring to FIGS. 1 and 2, an active capacitive stylus 100 in this embodiment includes a pen body 110, a receiver 120, an insulator 130, and a shell 140. The pen body 110 has an axial direction. Here, the axial direction is, for example, the Y direction, but is not limited thereto.

In this embodiment, the insulator 130 is sleeved on the pen body 110, and the receiver 120 is sleeved on the insulator 130. Specifically, the insulator 130 is located between the receiver 120 and the pen body 110. The insulator 130 entirely surrounds the outer periphery of the pen body 110. The receiver 120 surrounds a portion of the outer periphery of the pen body 110.

Specifically, in this embodiment, the receiver 120 includes an annular body 121. The annular body 121 has two opposite first sides A1 and two opposite second sides A2. The two first sides A1 are parallel to the axial direction (Y direction). The two first sides A1 are attached to the insulator 130 and spaced apart from each other to partially expose the insulator 130. The annular body 121 is bent at the second sides A2 so that the annular body 121 surrounds a portion of the outer periphery of the pen body 110, but is not limited thereto.

In this embodiment, the insulator 130 is used to reflect magnetic induction energy and shield the receiver 120 from interfering with internal circuits of the pen body 110. Specifically, the length of the insulator 130 in the axial direction (Y direction) is greater than or equal to the length of the first sides A1 in the axial direction (Y direction) to achieve an isolation effect. In this embodiment, the insulator 130 is an iron-based high-saturation induction amorphous alloy, specifically a silicon steel sheet, but the disclosure is not limited thereto.

In this embodiment, the shell 140 is sleeved on the pen body 110 and wraps around the receiver 120. The shell 140 includes a first housing 141 and a second housing 142 that are assembled together, but the disclosure is not limited thereto. Here, the shell 140 is made of a non-metallic material, such as rubber or plastic, but is not limited thereto.

Figure 3A:
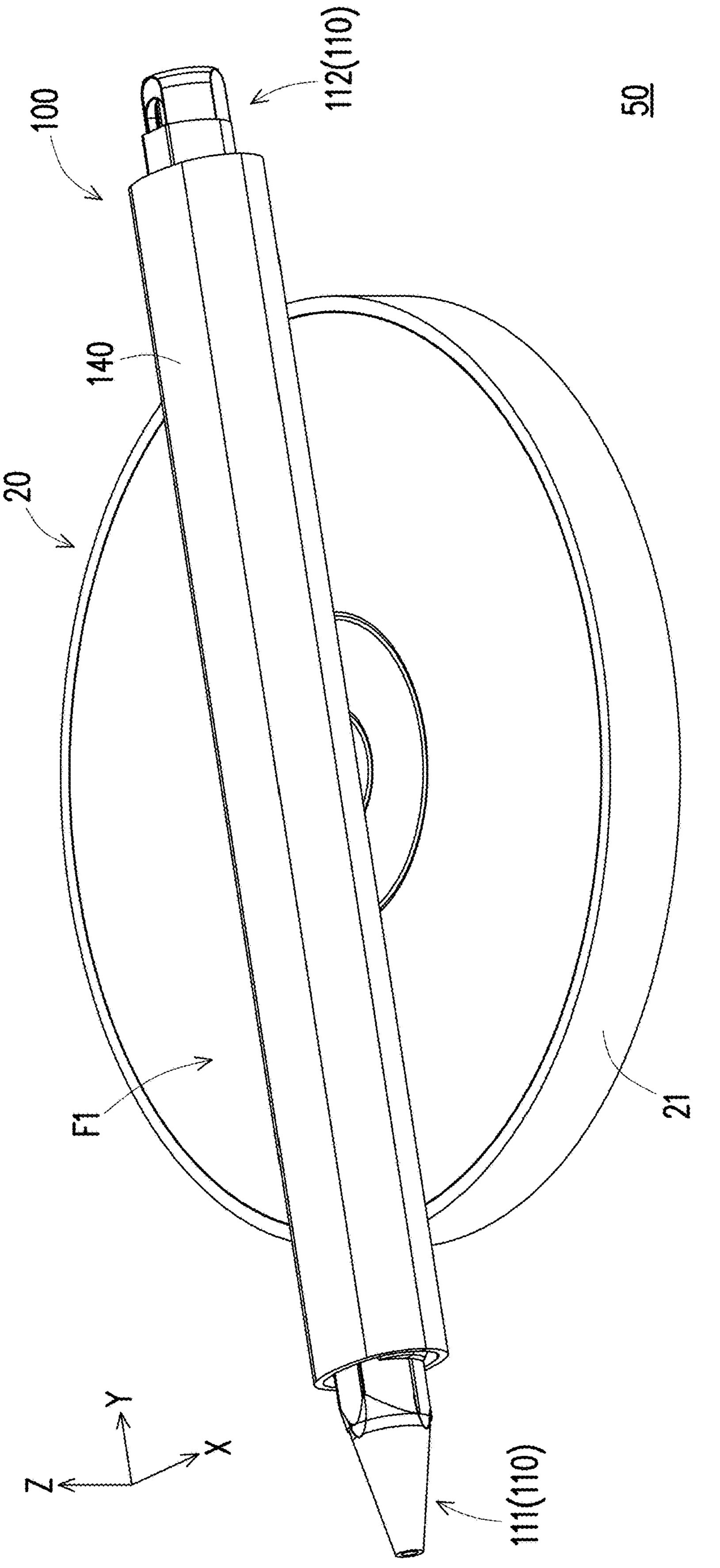
FIGS. 3A to 3C are schematic views of the active capacitive stylus in FIG. 1 applied to a wireless charging system.
Figure 3B:
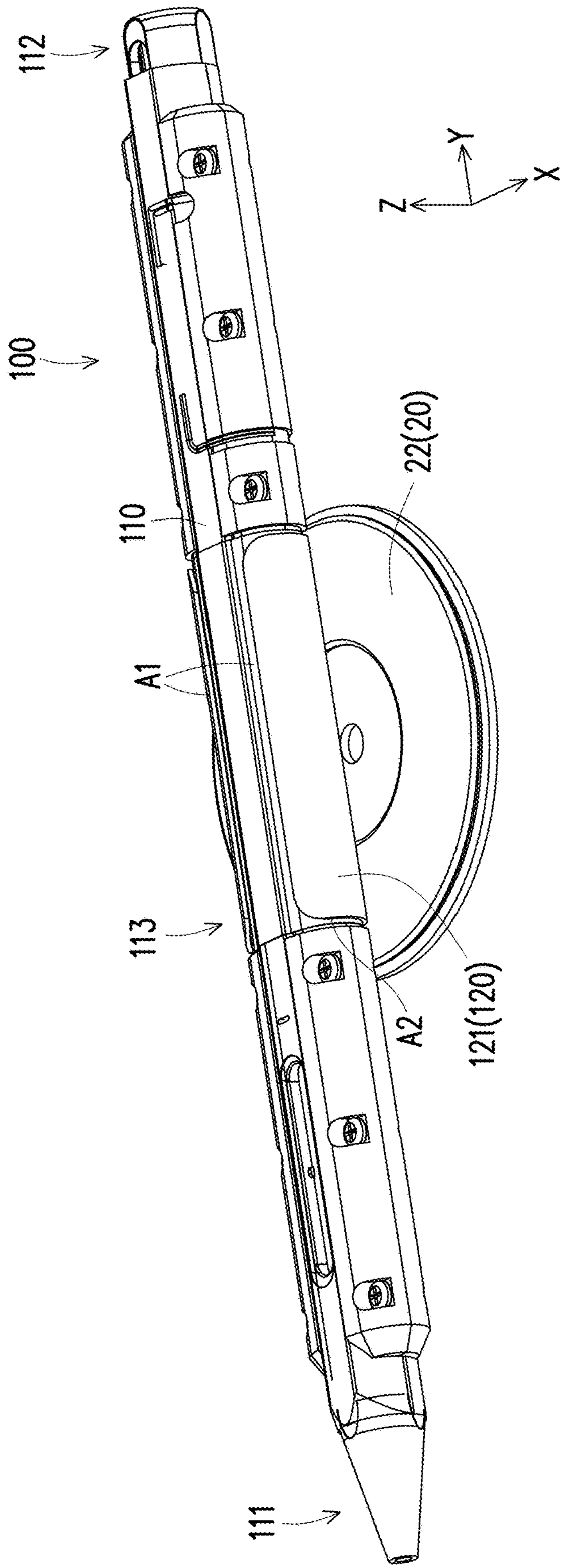
Figure 3C:
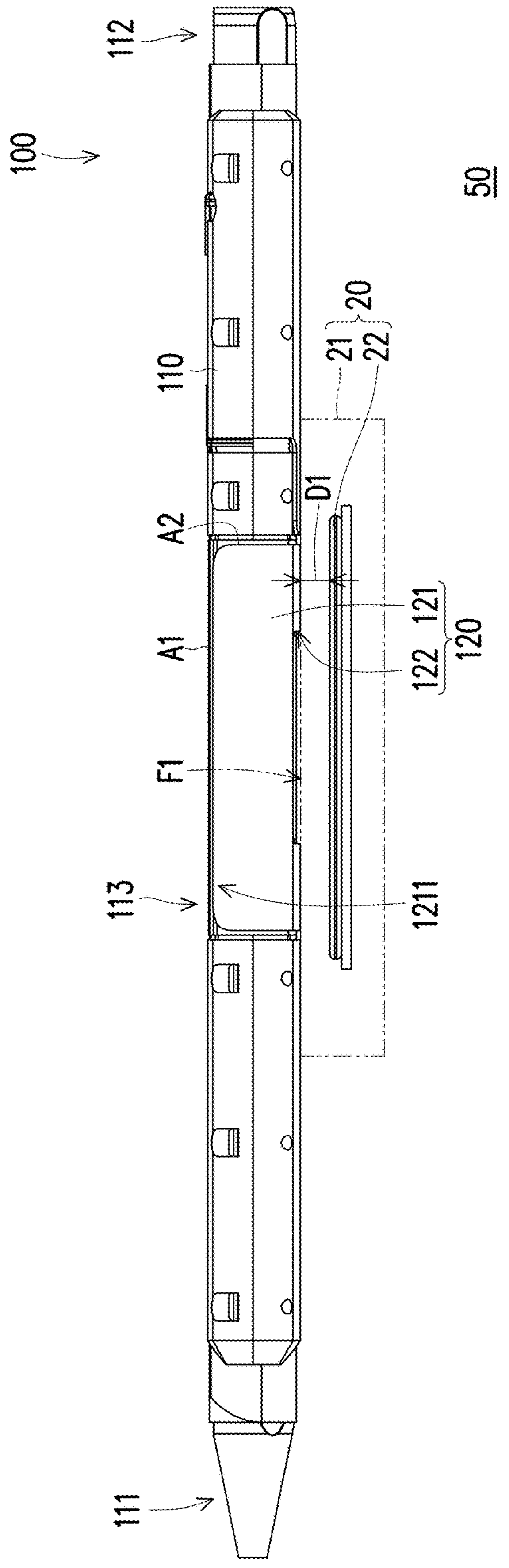

FIGS. 3A to 3C are schematic views of the active capacitive stylus in FIG. 1 applied to a wireless charging system. It should be noted that in FIGS. 3B and 3C, the shell of the active capacitive stylus is omitted. In FIG. 3B, the housing of the wireless charging transmitter is omitted. In FIG. 3C, the housing of the wireless charging transmitter is illustrated with dashed lines to facilitate the display and identification of the components being described.

Referring to FIGS. 3A to 3C, a wireless charging system 50 in this embodiment includes a wireless charging transmitter 20 and the active capacitive stylus 100 in FIG. 1. The wireless charging transmitter 20 is, for example, a standard Qi charging pad, such as an A11 or A11a specification, which is suitable for integration into a laptop or tablet computer, but the disclosure is not limited thereto. In the wireless charging system 50, the wireless charging transmitter 20 wirelessly transmits power to the active capacitive stylus 100. The active capacitive stylus 100 receives the wirelessly transmitted power and utilizes it to charge its internal battery and supply power to the components within the active capacitive stylus 100.

Specifically, in this embodiment, the wireless charging transmitter 20 includes a housing 21 and a transmission coil (TX) 22. The housing 21 has a charging surface F1. The transmission coil 22 is disposed within the housing 21 and placed on a ferrite. An axial direction of the transmission coil 22 is parallel to a normal direction of the charging surface F1. Here, the normal direction is, for example, parallel to the Z direction, but is not limited thereto.

In this embodiment, the receiver 120 and the transmission coil 22 perform short-range energy transfer through electromagnetic induction in compliance with the Qi standard. Qi is an interconnection standard for short-range, low-power, wireless inductive power transmission, established by the Wireless Power Consortium (WPC). In this embodiment, when the receiver 120 is aligned with the transmission coil 22, the wireless charging transmitter 20 is suitable for charging the active capacitive stylus 100. In this embodiment, the receiver 120 has a curvature, so the receiver 120 is not parallel to the transmission coil 22, but is not limited thereto.

In this embodiment, the receiver 120 is a receiving coil (RX) that supports the baseline power profile (5W BPP). The receiver 120 is a coil wound into a thin sheet with copper wire, with a sheet thickness of less than 0.15 millimeters, but is not limited thereto. The receiver 120 and the transmission coil 22 exhibit mutual inductance. A coefficient of coil coupling, represented by a K factor, is used to evaluate the energy transfer efficiency between the coils. A higher K factor indicates a better coupling efficiency, with a maximum value of 1. The K factor is defined as $K=L12/\sqrt{L11L22}$, where L11 represents the self-inductance of the transmission coil, measured in henries (H); L22 represents the self-inductance of the receiving coil, measured in henries (H); and L12 represents the mutual inductance between the two coils, measured in henries (H).

Referring to FIG. 3C, in the normal direction (Z direction) of the charging surface F1, a distance D1 is provided between the transmission coil 22 and the receiver 120.

According to experimental results, when the distance D1 is 2 millimeters, the K factor remains above 0.3 ($K \geq 0.30$). In this case, the K factor is measured by first measuring the inductance at a base of 100 KHz and then performing further calculations, but is not limited thereto. When $K \geq 0.30$, a positional offset is allowed between the transmission coil 22 and the receiver 120, and the charging components will not be damaged. The positional offset is, for example, 10 millimeters, but is not limited thereto. In this way, the charging method of the active capacitive stylus may be optimized. Furthermore, in an ideal state where there is no positional offset between the transmission coil 22 and the receiver 120, the K factor ranges from 0.6 to 0.8, but is not limited thereto. The positional offset mentioned above refers to an evaluation of whether the centers of the transmission coil 22 and the receiver 120 are aligned.

In this embodiment, the pen body 110 includes a pen tip 111, an end portion 112, and a holding portion 113 located between the pen tip 111 and the end portion 112. The receiver 120 is disposed at the holding portion 113. In this embodiment, the receiver 120 is disposed at a central position of the pen body 110. However, in other embodiments, the receiver 120 may also be positioned near the pen tip 111 or the end portion 112, as long as the active capacitive stylus 100 may be stably placed on the wireless charging transmitter 20 for charging. All such variations fall within the scope of protection of the disclosure and are not limited thereto.

Figure 4:
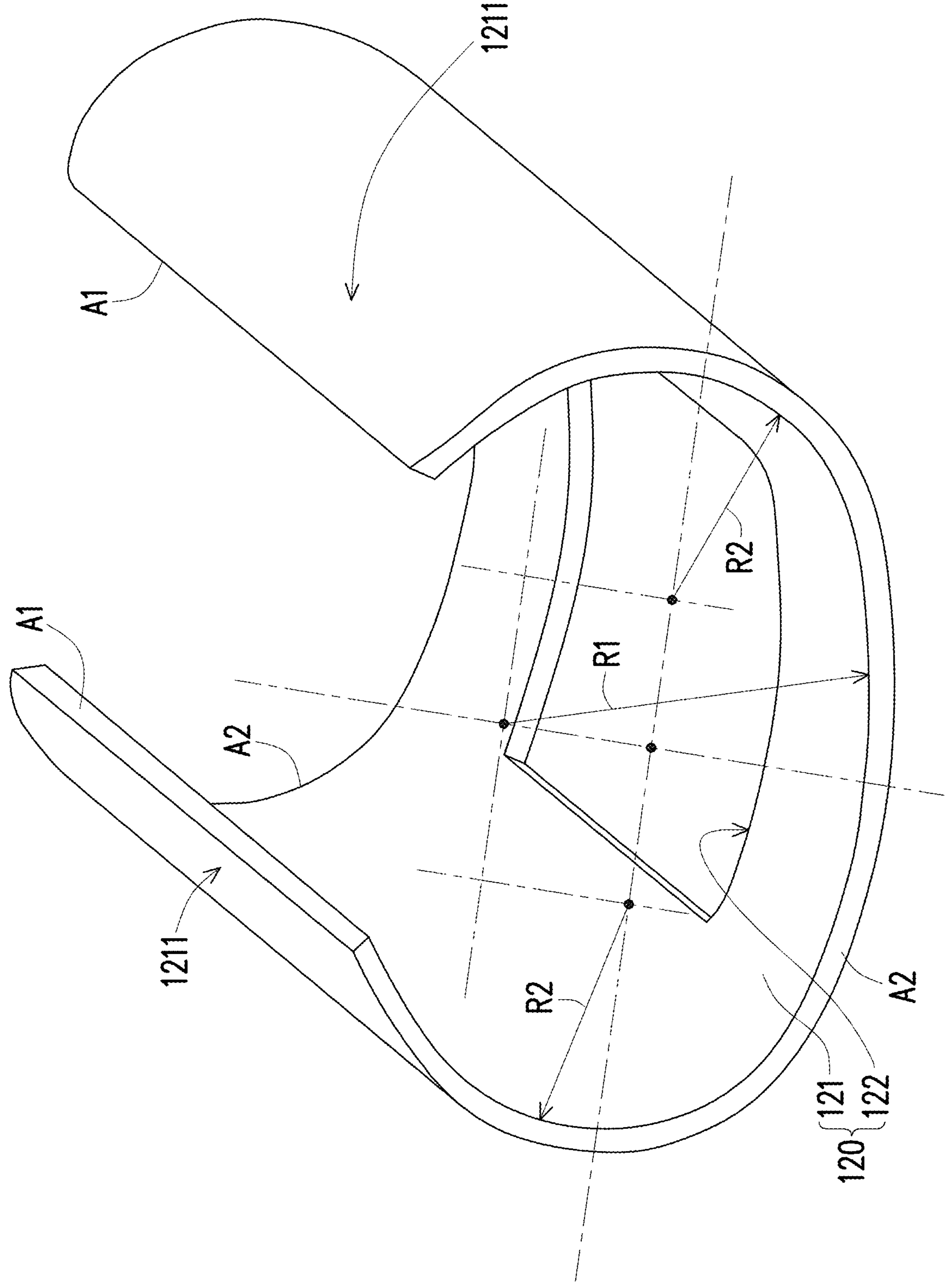
FIG. 4 is a perspective view of the receiver in FIG. 2.
Figure 5:
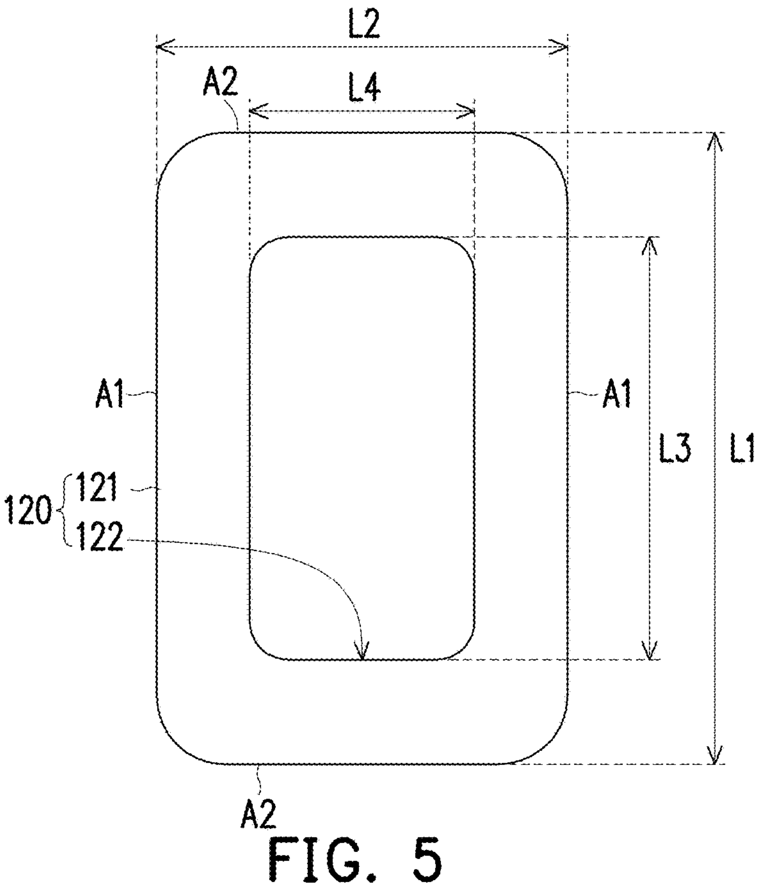
FIG. 5 is a developed plan view of the receiver in FIG. 4.

FIG. 4 is a perspective view of the receiver in FIG. 2. FIG. 5 is a developed planar view of the receiver in FIG. 4. To make the illustration clearer, FIG. 5 presents the receiver in an unfolded, planar form. The receiver in FIG. 5 is rectangular and hollow. However, as shown in FIG. 4, the receiver is actually an elliptical cylindrical structure, with the hollow portion extending along the elliptical cylindrical structure.

Referring to FIGS. 4 and 5, in this embodiment, the annular body 121 of the receiver 120 has two first end portions 1211 respectively corresponding to the two first sides A1. The two first end portions 1211 are bent toward each other so that inner surfaces of the annular body 121 are positioned to attach to the insulator 130.

More specifically, in this embodiment, the second sides A2 have a first radius of curvature R1 and a second radius of curvature R2. The first radius of curvature R1 is different from the second radius of curvature R2. In other words, the second sides A2 are composed of at least two segments with different curvatures, but are not limited thereto. The two arcs formed by the first radius of curvature R1 and the second radius of curvature R2 are tangential to each other, but are not limited thereto. For example, the first radius of curvature R1 is greater than or equal to 4.5 millimeters. The second radius of curvature R2 is greater than 3 millimeters. The advantage of this design is that the second sides A2 may be positioned as close as possible to the charging surface F1 to maintain charging efficiency. In this embodiment, the diameter of the pen body 110 is, for example, less than 10 millimeters to facilitate user grip, ensuring a comfortable user experience, but is not limited thereto.

Referring to FIG. 5, in this embodiment, a length L1 of the first sides A1 is greater than a length L2 of the second sides A2. The length L1 of the first sides A1 is, for example, 44.25±0.25 millimeters. The length L2 of the second sides A2 is, for example, 30.25±0.25 millimeters, but is not limited thereto.

In this embodiment, the receiver 120 has a hollow portion 122 that penetrates through the annular body 121. A length L3 of the long sides of the hollow portion 122 is, for example, 28.75±0.25 millimeters. A length L4 of the short sides of the hollow portion 122 is, for example, 14.75±0.25 millimeters, but is not limited thereto.

Figure 6:
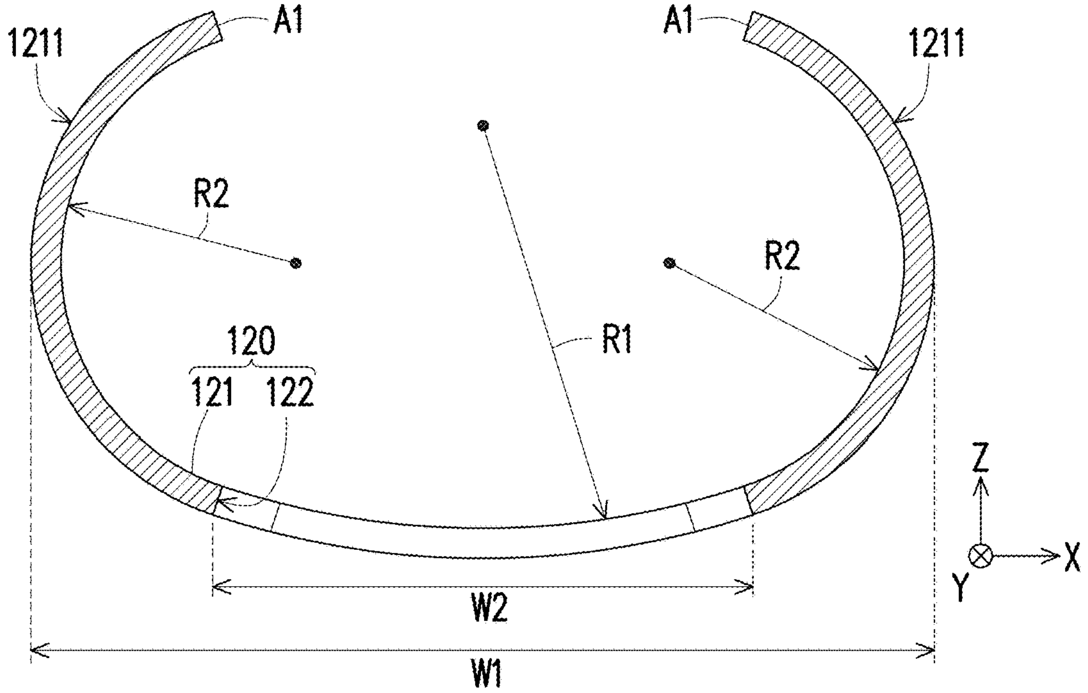
FIG. 6 is a sectional view of the receiver in FIG. 4.

FIG. 6 is a sectional view of the receiver in FIG. 4. Referring to FIG. 6, in this embodiment, in a cross-sectional view along a transverse direction (for example, the X direction), the annular body 121 has a first maximum width W1, and the hollow portion 122 has a second maximum width W2. The first maximum width W1 is greater than the second maximum width W2. The advantage of this design is that the two side edges of the hollow portion 122 in the X direction may be positioned as close as possible to the charging surface F1 to enhance magnetic induction, maintaining charging efficiency. Here, the transverse direction (X direction) is perpendicular to the axial direction (Y direction) of the pen body 110 in FIG. 1.

In summary, in the active capacitive stylus of the disclosure, the receiver is wrapped around the pen body to receive radio frequency signals. The receiver includes an annular body, and the first sides of the annular body are parallel to the axial direction of the pen body. The second sides of the receiver are bent to encircle the pen body. Furthermore, the second sides of the receiver are designed with different radii of curvature to closely conform to the charging surface. In this way, the hollow portion may also be positioned as close as possible to the charging surface to maintain charging efficiency. Accordingly, when the active capacitive stylus is paired with the wireless charging transmitter, an improved charging efficiency may be maintained.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An active capacitive stylus, comprising:

a pen body, having an axial direction;

a receiver, surrounding the pen body and used to receive a radio frequency signal, the receiver comprising an annular body, wherein the annular body has two opposite first sides and two opposite second sides, a length of each first side is greater than that of each second side, the two first sides are parallel to the axial direction, and each second side has a first radius of curvature and a second radius of curvature, the first radius of curvature being different from the second radius of curvature, wherein the first radius of curvature is greater than the second radius of curvature, wherein a first arc formed by the first radius of curvature is located between two second arcs respectively formed by the second radius of curvature, and the first arc formed by the first radius of curvature and the two second arcs formed by the second radius of curvature are tangential to each other;

an insulator, located between the receiver and the pen body; and a shell, sleeved on the pen body and wrapping around the receiver, wherein the insulator entirely surrounds the pen body, wherein a length of the insulator in the axial direction is greater than or equal to that of each first side in the axial direction, and the two first sides are attached to the insulator and spaced apart to partially expose the insulator.

2. The active capacitive stylus according to claim 1, wherein the pen body comprises a pen tip, an end portion, and a holding portion located between the pen tip and the end portion, the receiver being disposed at the holding portion.

3. The active capacitive stylus according to claim 1, wherein the annular body has two first end portions respectively corresponding to the two first sides, and the two first end portions are bent toward each other.

4. The active capacitive stylus according to claim 1, wherein the receiver has a hollow portion penetrating the annular body, and in a cross-sectional view along a direction perpendicular to the axial direction, the annular body has a first maximum width, the hollow portion has a second maximum width, and the first maximum width is greater than the second maximum width.

5. The active capacitive stylus according to claim 1, wherein the first radius of curvature is greater than or equal to 4.5 millimeters.

6. The active capacitive stylus according to claim 1, wherein the second radius of curvature is greater than 3 millimeters.

7. The active capacitive stylus according to claim 1, wherein the receiver is a coil wound into a thin sheet, and a thickness of the thin sheet is less than 0.15 millimeters.

* * * * *